United States Patent
Bogusz et al.

(10) Patent No.: US 10,496,165 B2
(45) Date of Patent: Dec. 3, 2019

(54) DEVICES AND HEADSETS

(71) Applicant: Arm Limited, Cambridge (GB)

(72) Inventors: Michal Karol Bogusz, Cambridge (GB); Piotr Tadeusz Chrobak, Cambridge (GB); Michal Golek, Kryry (PL); Tomasz Jan Pabis, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 15/981,479

(22) Filed: May 16, 2018

(65) Prior Publication Data

US 2018/0335837 A1    Nov. 22, 2018

(30) Foreign Application Priority Data

May 18, 2017   (GB) .................................. 1708000.3

(51) Int. Cl.
 *G06F 3/01* (2006.01)
 *G06F 3/0346* (2013.01)
 *G02B 27/00* (2006.01)

(52) U.S. Cl.
 CPC .......... *G06F 3/013* (2013.01); *G02B 27/0093* (2013.01); *G06F 3/011* (2013.01); *G06F 3/0346* (2013.01)

(58) Field of Classification Search
 CPC ........ G06F 3/011; G06F 3/013; G06F 3/0346; G02B 27/017
 See application file for complete search history.

(56) References Cited

U.S. PATENT DOCUMENTS

| | | | |
|---|---|---|---|
| 2015/0002676 A1* | 1/2015 | Yoo | G02B 27/017 348/159 |
| 2015/0029096 A1 | 1/2015 | Ishihara | |
| 2016/0025971 A1* | 1/2016 | Crow | G02B 27/0093 345/156 |
| 2017/0011249 A1* | 1/2017 | Wang | G06K 9/0061 |

FOREIGN PATENT DOCUMENTS

| | | |
|---|---|---|
| CN | 105070258 A | 11/2015 |
| CN | 106406501 A | 2/2017 |
| CN | 106527662 A | 3/2017 |
| JP | 2012203127 A | 10/2012 |
| WO | 2016014608 A1 | 1/2016 |

OTHER PUBLICATIONS

United Kingdom Combined Search and Examination Report dated Sep. 11, 2017 on related application No. GB 1708000.3, filed May 18, 2017.

* cited by examiner

*Primary Examiner* — Michael Pervan
(74) *Attorney, Agent, or Firm* — EIP US LLP (57) ABSTRACT

A device comprises a content-processing component operable to perform a content-processing operation. The device comprises a sensor operable to output data indicative of activity of an eyelid of a user of the device. The device comprises a processor configured to process the data output by the sensor, to cause the content-processing operation to be in an enabled state in response to the processing of the data output by the sensor indicating that the eyelid is open by more than an open-eyelid threshold, and to cause the content-processing operation to be in a disabled state in response to the processing of the data output by the sensor indicating that the eyelid is closed by more than a closed-eyelid threshold.

18 Claims, 3 Drawing Sheets

DEVICES AND HEADSETS

CROSS REFERENCE TO RELATED APPLICATIONS

This application claims the benefit under 35 U.S.C. § 119(a) and 37 CFR § 1.55 to United Kingdom patent application no. GB1708000.3, filed on May 18, 2017, the entire content of which is incorporated herein by reference.

BACKGROUND OF THE INVENTION

Technical Field

The present disclosure relates to devices and headsets.

Background

Devices are becoming more complex to meet growing user experience expectations. In particular, content-processing components of such devices, such as graphics processing units, video processing units and display processing units, are becoming more complicated. Although increased complexity of such components can enhance user experience by providing increased content-processing capabilities, it can also increase power consumption levels of such components and devices.

SUMMARY

In a first embodiment, there is provided a device comprising:
  a content-processing component operable to perform a content-processing operation;
  a sensor operable to output data indicative of activity of an eyelid of a user of the device; and
  a processor configured to:
    process the data output by the sensor;
    cause the content-processing operation to be in an enabled state in response to the processing of the data output by the sensor indicating that the eyelid is open by more than an open-eyelid threshold; and
    cause the content-processing operation to be in a disabled state in response to the processing of the data output by the sensor indicating that the eyelid is closed by more than a closed-eyelid threshold.

In a second embodiment, there is provided a device comprising:
  a content-processing component operable to perform a content-processing operation;
  a sensor operable to output data indicative of activity of an eyelid of a user of the device; and
  a processor configured to:
    process the data output by the sensor;
    cause the content-processing operation to be in a first content-processing operation state in response to the processing of the data output by the sensor indicating that the eyelid is in a first state; and
    cause the content-processing operation to be in a second content-processing operation state in response to the processing of the data output by the sensor indicating that the eyelid is in a second state.

In a third embodiment, there is provided a headset comprising a processor configured to process eyelid activity data output by an infrared sensor of the headset and to control an operation performable by the headset based on the eyelid activity data output by the infrared sensor.

Further features and advantages of embodiments will become apparent from the following description of preferred embodiments, given by way of example only, which is made with reference to the accompanying drawings.

DETAILED DESCRIPTION OF CERTAIN INVENTIVE EMBODIMENTS

Examples described herein provide measures to enhance power-saving in relation to devices and content-processing components of such devices.

Figure 1:
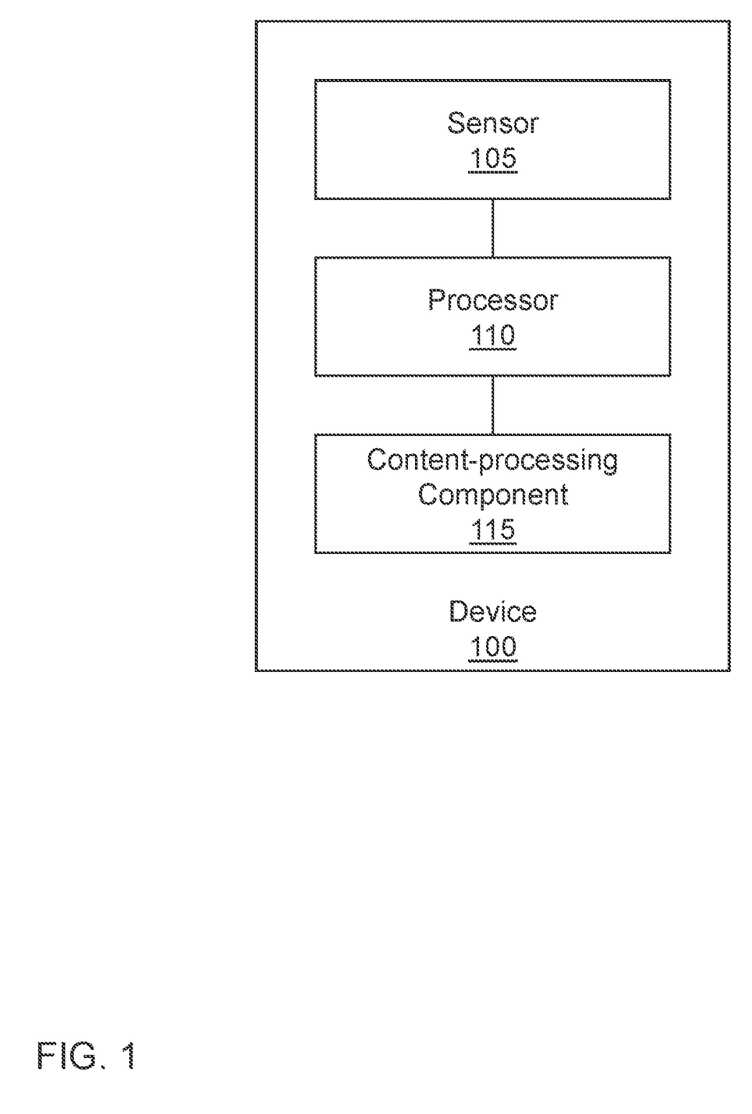
FIG. 1 shows a schematic block diagram depicting an example of a device in accordance with embodiments.

Referring to FIG. 1, there is shown schematically an example of a device 100.

In some examples, the device is or is comprised in a wearable device. An example of a wearable device is a headset. A headset may be in the form of a head-mounted display (HMD). An HMD is a display device worn on the head of a user (or 'wearer'). An HMD has one or more display screens (or 'display panels' or 'display optics') each corresponding to one or both eyes of the user. An HMD with a single display screen corresponding to a single eye of the user may be known as a monocular HMD. An HMD with two display screens, one for each eye of the user, may be known as a binocular HMD. The HMD may be an optical HMD (OHMD), which can reflect projected images while still allowing the wearer to see through the display screen part of the device. In some examples, the headset is a VR headset. A VR headset provides a VR experience for its wearer based on VR content.

In this example, the device 100 comprises a sensor 105, a processor 110 and a content-processing component 115. The sensor 105 is communicatively coupled to the processor 110 via a communication channel. The communication channel between the sensor 105 and the processor 110 may use an industry-standard communication technology or otherwise. Examples of such industry-standard communication technologies include, but are not limited to, Inter-Integrated Circuit (I2C) and 1-Wire. The content-processing component 115 is communicatively coupled to the processor 110 via a communication channel. The device 100 may comprise one or more sensors 105, one or more processors 110 and one or more content-processing components 115. The device 100 may comprise one or more components not depicted in FIG. 1, for example one or more memories, one or more user interfaces, one or more display screens and/or one or more batteries or power sources. The one or more memories may store one or more computer programs comprising computer-readable instructions executable by the processor 110. Execution of the computer-readable instructions by the processor 110 may result in one or more of the methods and techniques described herein being performed.

The sensor 105 is operable to output data indicative of activity of one or both eyelids of a user of the device 100 to the processor 110. Such data may be referred herein to as 'eyelid activity data'. The sensor 105 may output the eyelid activity data based on a trigger. Examples of the trigger include, but are not limited to, expiry of a predetermined time period or the occurrence of another predetermined event.

The eyelid activity data may be indicative of a current state of the eyelid and/or a change of state of the eyelid. For example, the eyelid activity data may indicate that the eyelid is currently in a fully open state, a partly open state, a partly closed state or a fully closed state and/or has changed from one of those states to another of those states. A state change may be indicated using an interrupt to the processor 110. Where the eyelid cycles through a sequence of predefined states (such as fully open, to partly open, to partly closed, to fully closed), indicating a change of state from one predefined state to the next may involve use of less data than indicating an absolute state of the eyelid.

The eyelid may be considered to be in the partly open state when it is not fully open but when it is open by more than a threshold, referred to herein as the open-eyelid threshold. The open-eyelid threshold may, for example, correspond to the eyelid being halfway between being fully open and being fully closed. When the eyelid is open by more than such an open-eyelid threshold, the eyelid is more open than it is closed. The open-eyelid threshold may however correspond to a different measure of the extent to which the eyelid is open. For example, the open-eyelid threshold may correspond to the eyelid being 20% open (which corresponds to the eyelid being 80% closed). The measure of the extent to which the eyelid is open or closed may correspond to an amount of separation between the edges (or 'margins') of the upper and lower parts of the eyelid. The eyelid may be considered to be at least partly open when the eyelid is in the fully open state or the partly open state.

The eyelid may be considered to be in the partly closed state when it is not fully closed but when it is closed by more than a threshold, referred to herein as the closed-eyelid threshold. The closed-eyelid threshold may, for example, correspond to the eyelid being halfway between being fully closed and being fully open. When the eyelid is closed by more than such a closed-eyelid threshold, the eyelid is more closed than it is open. The closed-eyelid threshold may however correspond to a different measure of the extent to which the eyelid is closed. For example, the open-eyelid threshold may correspond to the eyelid being 80% closed (which corresponds to the eyelid being 20% open). The eyelid may be considered to be at least partly closed when the eyelid is in the fully closed state or the partly closed state.

In some examples, the sensor 105 comprises an infrared (IR) sensor arranged to sense electromagnetic radiation in the IR part of the electromagnetic spectrum. An IR sensor is a readily available type of sensor. An IR sensor may have a relatively short operating range, which may be effective for some types of device 100. In some examples, the sensor 105 comprises a visible light sensor arranged to sense electromagnetic radiation in the visible light part of the electromagnetic spectrum. A visible light sensor may have a relatively long operating range, which may be effective for other types of device 100. The sensor 105 may comprise one type or multiple different types or sensor.

The content-processing component 115 may be a content-visualisation component that is responsible for visualisation of content. The content-processing component 115 may be part of a multimedia (or 'graphics and multimedia') subsystem of the device 100. The multimedia subsystem may be a part of the device 100 that is optimised for or dedicated to processing multimedia data, such as VR content. The content-processing component may comprise one or more graphics processing units, one or more video processing units and/or one or more display processing units. A graphics processing unit may render graphics content into memory. A video processing unit may encode and decode video content. A display processing unit may control output to a display screen and may allow the graphics processing unit to offload some tasks such as multi-layer composition and image post-processing.

The content-processing component 115 is operable to perform one or more content-processing operations. The content-processing component 115 may be operable to perform a content-processing operation under the control of the processor 110, for example based on eyelid activity data. Examples of content-processing operations include, but are not limited to, storing content, retrieving content, encoding content, decoding content, rendering content and displaying content.

For example, a graphics processing unit may perform a content-processing operation to store content to be displayed in memory, to read stored content from memory, to render content according to programmed sequences and/or to store the results of rendering back into memory before they are displayed. A video processing unit may perform a content-processing operation to encode rendered content before it is written back into memory, to save bandwidth on a system bus. A display processing unit may perform a content-processing operation before the content reaches a display screen. Examples of such processing operations performed by the display processing unit include, but are not limited to, composition, scaling and enhancing. A display processing unit may perform a content-processing operation to convey content from memory to a display screen.

The processor 110 serves as a controller of the device 100. The processor 110 may be a microprocessor. The processor 110 is configured to process the eyelid activity data output by the sensor 105 and to control the device 100 based on its processing of the eyelid activity data.

In particular, the processor 110 is configured to cause the content-processing operation performable by the content-processing component 115 to be in an enabled state in response to the processing of the eyelid activity data indicating that the eyelid is open by more than the open-eyelid threshold. References herein to the content-processing operation being enabled are intended to correspond to the content-processing operation being in the enabled state. Further, the processor 110 is configured to cause the content-processing operation to be in a disabled state in response to the processing of the eyelid activity data indicating that the eyelid is closed by more than the open-eyelid threshold. References herein to the content-processing operation being disabled are intended to correspond to the content-processing operation being in the disabled state. As such, the content-processing operation may be disabled and enabled dependent on activity of the eyelid of the user. For example, as will be described in more detail below, the content-processing operation may be disabled and enabled during different stages of a human blink cycle so that content is not processed when the eyelid is nearly and fully closed, thereby saving power when the user would not see such content. The content-processing operation may be associated with multiple different enabled and/or disabled states corresponding to different degrees of enablement and/or disablement.

The open-eyelid threshold may be the same as the closed-eyelid threshold. For example, the open-eyelid threshold, in relation to which the content-processing operation is enabled, may correspond to the eyelid being 20% open (corresponding to 80% closed) and the closed-eyelid threshold, in relation to which the content-processing operation is disabled, may correspond to the eyelid being 80% closed (corresponding to 20% open). Having the open-eyelid threshold the same as the closed-eyelid threshold may provide a relatively uncomplicated mechanism for determining a state of the eyelid and hence whether the content-processing operation is to be enabled or disabled.

Alternatively, the open-eyelid threshold may be different from the closed-eyelid threshold. For example, the open-eyelid threshold, in relation to which the content-processing operation is enabled, may correspond to the eyelid being 20% open (corresponding to 80% closed) and the closed-eyelid threshold, in relation to which the content-processing operation is disabled, may correspond to the eyelid being 90% closed (corresponding to 10% open). In such cases, processing may be dependent on whether the eyelid is closing or opening. For example, the content-processing operation may be enabled when the eyelid is fully open and while the eyelid is closing until the eyelid is more than 90% closed, in response to which the content-processing operation is disabled. The content-processing operation remains disabled as the eyelid continues to close, while the eyelid is fully closed and while the eyelid is opening until the eyelid is more than 20% open, in response to which the content-processing operation is enabled. Allowing the open-eyelid threshold to be different from the closed-eyelid threshold may result in a more optimisable solution albeit with increased complexity.

In some examples, the processor 110 is configured to cause the content-processing operation to be in the disabled state in response to detecting that the user is not using the device 100. As such, power can be saved by disabling the content-processing operation when the device 100 is not being used. For example, where the device 100 is a headset, the processor 110 may be configured to cause the content-processing operation to be in the disabled state in response to detecting that the user is not wearing the headset.

As such, the processor 110 uses the eyelid activity data to provide enhanced power-saving measures by disabling the content-processing operation performable by the content-processing component 115. The fact that humans blink can therefore be used to reduce power consumption by disabling one or more content-processing operations when the user is not able to view content. Optimising the time characteristic of processing of content by the content-processing component 115 in this way may provide a robust power-saving solution, and may not involve complex algorithms and large amounts of additional logic. Such enhanced power-saving measures may be especially effective where the device 100 is battery-powered in that they can result in increased battery life. However, enhanced power-saving measures may also be effective where the device 100 is mains-powered in that they can reduce power consumption requirements and/or improve energy efficiency credentials of the device 100.

The time for a blink of a human eyelid includes periods of the eyelid closing, the eyelid being fully closed and the eyelid opening following being fully closed. During the part of the blink in which the eyelid is considered to be closed, the content-processing operation may be disabled such that content is not displayed to the user. As such, content is only intermittently displayed to the user. Although such 'blinking' of content, in other words the intermittent displaying and non-displaying of content, may be detectable by a high-speed camera, such blinking may not be detectable by a human user of the device 100.

Closing of a human eyelid is believed to take around 70 milliseconds (ms), whereas opening takes around 430 ms. Between closing and opening of the eyelid, there is a short time period during which the eyelid is fully closed. This time period varies but may be at least 50 ms. The time period during which the eyelid may be considered to be closed may be extended by periods either side of the eyelid being fully closed, in which the eyelid is the eyelid is almost closed and in which the eyelid is being opened following its closure. This gives around 100 ms in which content visualisation may be disabled. As such, human perception may not be able to recognise that displaying of content is disabled during parts of the human blinking cycle. Power savings may therefore be achieved where frames that would conventionally be displayed when the user blinks are not processed or displayed.

The frame rate in VR may for example be 90 frames per second (fps) or 120 fps. Assuming a frame rate of 120 fps such that the duration of one frame is approximately 8.3 ms, a 100 ms (i.e. a 0.1 second) blink period, during which visualisation of content may be disabled, would involve 120/10=12 frames. This corresponds to 10*12=120 frames per minute during which visualisation of content may be disabled based on 10 blinks per minute, 12*12=144 frames per minute during which visualisation of content may be disabled based on 12 blinks per minute and 15*12=180 frames per minute during which visualisation of content may be disabled based on 15 blinks per minute.

A frame rate of 120 fps corresponds to 60*120=7,200 frames per minute. As such, 120/7,200≈1.67% of frames may not be displayed assuming 10 blinks per minute, 144/7,200≈2% of frames may not be displayed assuming 12 blinks per minute, and 180/7,200≈2.5% of frames may not be displayed assuming 15 blinks per minute.

In some examples, the processor 110 is operable to cause the content-processing operation to change from being in one of the enabled state and the disabled state (for example the enabled state) to being in the other of the enabled state and the disabled state (for example the disabled state) by issuing a content-processing operation state change request (to request the change from the enabled state to the disabled state).

The processor 110 may be configured to determine, in response to a trigger, whether the content-processing operation has changed from being in the one of the enabled state and the disabled state (for example the enabled state) to being in the other of the enabled state and the disabled state (for example the disabled state) following the issuing of the content-processing operation state change request (to request the change from the enabled state to the disabled state). In some examples, the trigger is expiry of a predetermined time period. However, other triggers such as the occurrence of another predetermined event may be used.

The processor 110 may be configured to issue a cancellation request to request cancellation of the content-processing operation state change request in response to the processor 110 determining that a current state of the eyelid is associated with the one of the enabled state and the disabled state (for example the enabled state) and determining that the content-processing operation has not changed from being in the one of the enabled state and the disabled state (for example the enabled state) to being in the other of the enabled state and the disabled state (for example the disabled state) following the issuing of the content-processing operation state change request (to change from the enabled state to the disabled state). This enhances user experience by influencing the state of the content-processing operation based on current eyelid activity.

Figure 2A:
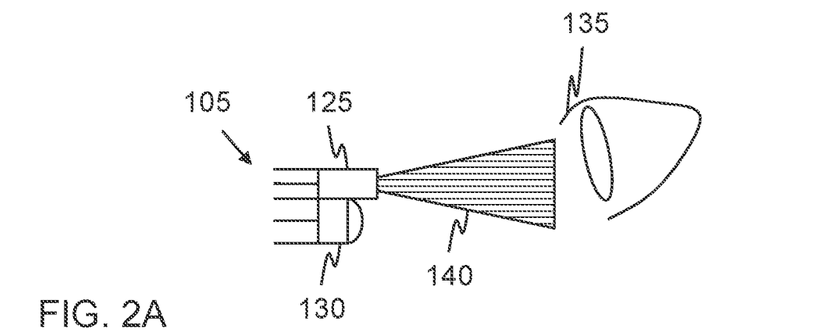
FIGS. 2A to 2D show schematically examples of sensors arranged to output data in accordance with embodiments.
Figure 2B:
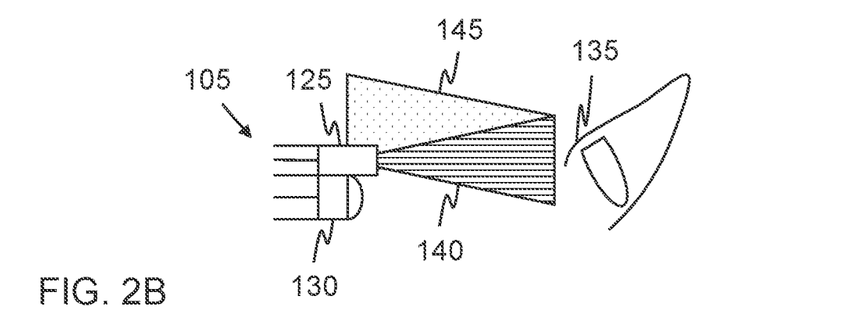
Figure 2C:
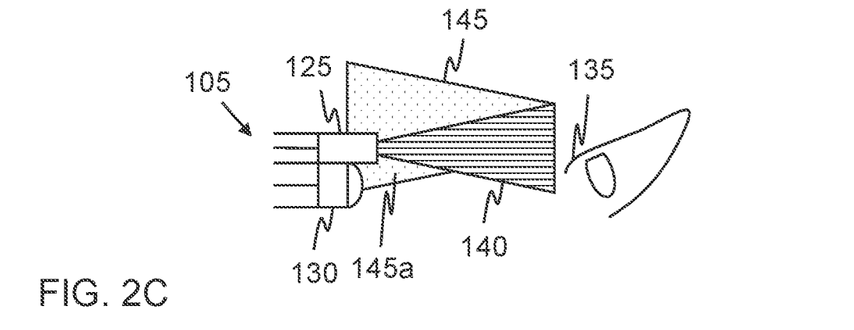
Figure 2D:
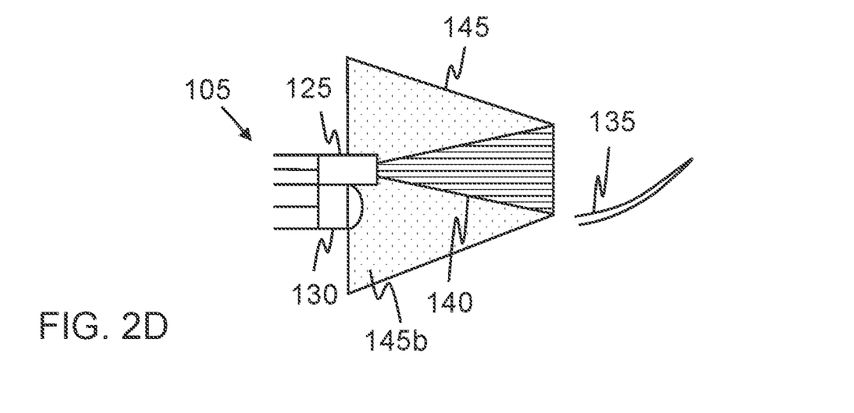

Referring to each of FIGS. 2A to 2D, there is shown schematically an example of a sensor 105 arranged to detect activity of an eyelid of a user of a device (such as the example device 100 described above with reference to FIG. 1) and to output data indicative of such activity (for example to a processor such as the processor 110 described above with reference to FIG. 1). FIGS. 2A to 2D depict several stages of the eyelid closing during a blink, from the eyelid of a user being in a fully open state (FIG. 2A), to being in a partly open state (FIG. 2B), to being in a partly closed state (FIG. 2C), and finally to being in a fully closed state (FIG. 2D). FIGS. 2A to 2D also depict several stages of the eyelid opening during a blink, from the eyelid of a user being in a fully closed state (FIG. 2D), to being in a partly closed state (FIG. 2C), to being in a partly open state (FIG. 2B), and finally to being in a fully open state (FIG. 2A).

In this example, the sensor 105 is an IR sensor. In this example, the IR sensor comprises a light-emitting diode (LED) 125 arranged to emit IR and a detector 130 arranged to detect IR reflected from the eyelid 135 of the user. IR emitted by the LED 125 is reflected by the eyelid 135, but passes through the eye when the eyelid 135 is open. Reflected IR is detected by the detector 130.

As shown in FIG. 2A, the eyelid 135 of the user is in a fully open state. The IR 140 emitted by the LED 125 passes through the eye of the user without any or only a negligible amount of the IR 140 being reflected back towards the sensor 105. The content-processing operation may be enabled when the eyelid 135 is in the fully open state.

As shown in FIG. 2B, the eyelid 135 of the user is in a partly open state. The content-processing operation may be enabled when the eyelid 135 is in the partly open state. Although most of the IR 140 emitted by the LED 125 passes through the eye of the user, a portion of the IR 140 emitted by the LED 125 is reflected back towards the detector 130 as reflected IR 145. Although there is some reflected IR 145, it is not detected, or only a negligible amount is detected, by the detector 130.

As shown in FIG. 2C, the eyelid 135 of the user is in a partly closed state. The content-processing operation may be disabled when the eyelid 135 is in the partly closed state. Although a portion of the IR 140 emitted by the LED 125 passes through the eye of the user, some of the IR 140 emitted by the LED 125 is reflected back towards the detector 130 as reflected IR 145. A portion 145*a* of the reflected IR 145, which is not present in the reflected IR 145 shown in FIG. 2B, is detected by the detector 130. The closed-eyelid threshold may correspond to the extent to which the eyelid is closed when the detector 130 first detects a non-negligible amount of reflected IR 145.

As shown in FIG. 2D, the eyelid 135 of the user is in a fully closed state. The content-processing operation may be disabled when the eyelid 135 is in the fully closed state. Most of the IR 140 emitted by the LED 125 is reflected back towards the detector 130 as reflected IR 145. A portion 145*b* of the reflected IR 145, which is larger than the portion 145*a* of reflected IR 145 shown in FIG. 2C, is detected by the detector 130. With reference to the reflected IR portions 145*a* and 145*b* shown in FIGS. 2C and 2D respectively, the detector 130 detects more of the reflected IR 145 when the eyelid 135 is in the fully closed state than when the eyelid 135 is in the partly closed state.

The sensor 105 and/or a processor to which the sensor 105 outputs eye activity data (such as the processor 110 described above with reference to FIG. 1) may be able to determine whether the eyelid is being closed or is being opened. For example, the sensor 105 and/or processor may be able to determine whether the eyelid is being closed or is being opened based on a measure of the change in the level of reflected IR 145. For example, where the level of the reflected IR 145 increases (for example from a relatively low value to a relatively high value), the eyelid may be deemed to be closing, such as would be the case in the transition from the state shown in FIG. 2B, to the state shown in FIG. 2C, to the state shown in FIG. 2D. Where the level of the reflected IR 145 decreases (for example from a relatively high value to a relatively low value), the eyelid may be deemed to be opening, such as would be the case in the transition from the state shown in FIG. 2D, to the state shown in FIG. 2C, to the state shown in FIG. 2B.

As described above, the closed-eyelid threshold may correspond to the extent to which the eyelid is to be closed, when the eyelid is closing, beyond which the content-processing operation is disabled and the open-eyelid threshold may correspond to the extent to which the eyelid is to be open, when the eyelid is opening, beyond which the content-processing operation is enabled. As also described above, the closed-eyelid threshold may be the same as the open-eyelid threshold, for example where the content-processing operation can be disabled or enabled based solely on knowledge of the extent to which the eyelid is closed or open. However, the closed-eyelid threshold may be different from the open-eyelid threshold, for example where one threshold can be used for when the eyelid is being closed and another threshold can be used for when the eyelid is being opened. For example, the closed-eyelid threshold, in relation to which the content-processing operation is disabled, may correspond to the eyelid being more than 90% closed (corresponding to 10% open) when the eyelid is being closed and the open-eyelid threshold, in relation to which the content-processing operation is enabled, may correspond to the eyelid being more than 20% open (corresponding to 80% closed) when the eyelid is being opened. Different thresholds may therefore be used where the extent to which the eyelid is open or closed and the ability of the user to perceive the presence or absence of content being displayed differs in relation to the eyelid closing and the eyelid opening.

When the device is not being used (for example where the device is a headset and the headset is not being worn), there may be no reflected IR. In such examples, the content-processing operation may be disabled. However, since IR may not be reflected in situations in which the device is being used (but in which the eyelid of the user is fully or partly open) and in which the device is not being used, additional data may be used to disambiguate between both possible scenarios. The additional data may be obtained from one or more further sensors of the device. Examples of such sensors include, but are not limited to, accelerometers and gyroscopes.

Although, in FIGS. 2A to 2D, the sensor 105 is an IR sensor, other types of sensor may be used, as described above. For example, a high-speed digital camera which captures visible light may be used. Image-processing techniques may be used to identify eyelid activity based on images captured by the high-speed digital camera. However, use of a high-speed digital camera may be more complex and power-consuming than use of an IR sensor. Furthermore, use of a high-speed digital camera may involve the content-processing component being enabled to provide image-processing and camera-communication functionality. As such, use of an IR sensor may provide a low-power sensor, compared to use of a high-speed digital camera.

Figure 3:
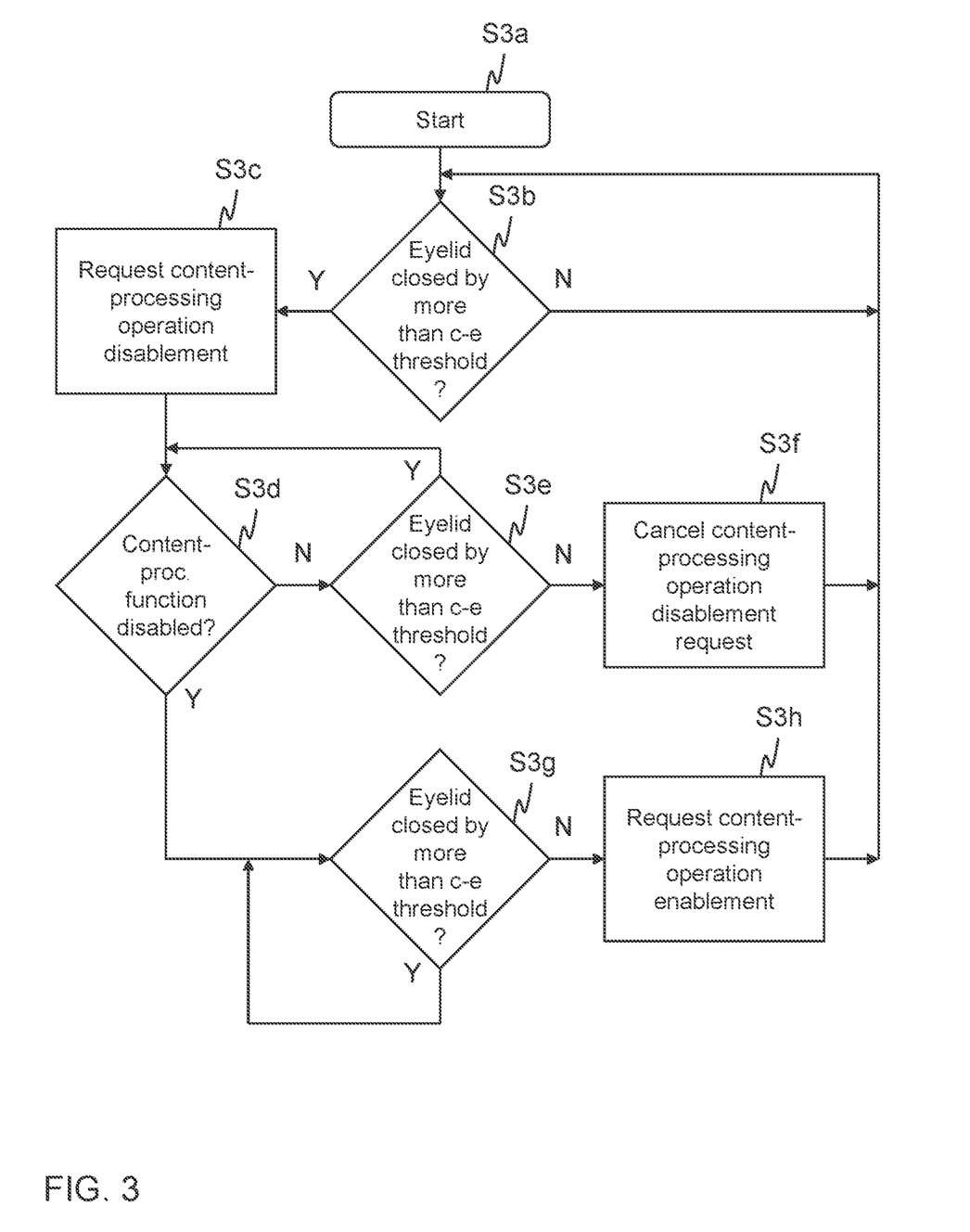
FIG. 3 shows a flowchart depicting an example of a method in accordance with embodiments.

Referring to FIG. 3, there is shown an example of a method of controlling a device. This method provides a handling mechanism to allow a processor (such as the processor 110 described above with reference to FIG. 1) to analyse and react promptly to changes to the state of an eyelid.

At item S3a, the method starts. The method may be performed whenever the device is being used.

At item S3b, a decision is made as to whether or not the eyelid of the user is closed by more than the closed-eyelid threshold.

When it is decided, at item S3b, that the eyelid of the user is not closed by more than the closed-eyelid threshold, processing returns to item S3b.

When it is decided, at item S3b, that the eyelid of the user is closed by more than the closed-eyelid threshold, processing proceeds to item S3c.

At item S3c, disablement of the content-processing operation is requested and processing proceeds to item S3d.

At item S3d, a decision is made as to whether or not the content-processing operation has been disabled following the request of item S3c.

When it is decided, at item S3d, that the content-processing operation has not been disabled, processing proceeds to item S3e. The content-processing operation may not have been disabled, despite the request of item S3c, where there is a delay between the request of item S3c being issued and the request being performed.

At item S3e, a decision is made as to whether or not the eyelid of the user is closed by more than the closed-eyelid threshold.

When it is decided, at item S3e, that the eyelid of the user is closed by more than the closed-eyelid threshold, processing returns to item S3d. As such, when the content-processing operation has not been disabled following the request of S3c, but when the eyelid is still closed by more than the closed-eyelid threshold, the method continues to check whether the content-processing operation has been disabled.

When it is decided, at item S3e, that the eyelid of the user is not closed by more than the closed-eyelid threshold, processing proceeds to item S3f. At item S3f, the request of S3c to disable the content-processing operation is cancelled and processing returns to item S3b. As such, when the content-processing operation has not been disabled following the request of S3c, but when the eyelid is now not closed by more than the closed-eyelid threshold, the method cancels the request to disable the content-processing operation, such that the content-processing operation remains enabled.

Returning to item S3d, when it is decided, at item S3d, that the content-processing operation has been disabled, processing proceeds to item S3g.

At item S3g, a decision is made as to whether or not the eyelid of the user is closed by more than the closed-eyelid threshold.

When it is decided, at item S3g, that the eyelid of the user is closed by more than the closed-eyelid threshold, processing returns to item S3g.

When it is decided, at item S3g, that the eyelid of the user is not closed by more than the closed-eyelid threshold, processing proceeds to item S3h.

At item S3h, enablement of the content-processing operation is requested and processing returns to item S3b. As such, when the content-processing operation has been disabled following the request of S3c but when the eyelid is now not closed by more than the closed-eyelid threshold, the method involves requesting enablement of the content-processing operation.

Various measures (for example devices, methods, computer programs and processors) are therefore provided in which a device comprises a content-processing component, a sensor and a processor. The content-processing component is operable to perform a content-processing operation. The sensor is operable to output data indicative of activity of an eyelid of a user of the device. The processor is configured to process the data output by the sensor. The processor is also configured to cause the content-processing operation to be in an enabled state in response to the processing of the data output by the sensor indicating that the eyelid is open by more than an open-eyelid threshold. The processor is also configured to cause the content-processing operation to be in a disabled state in response to the processing of the data output by the sensor indicating that the eyelid is closed by more than a closed-eyelid threshold.

The eyelid being open by more than the open-eyelid threshold may correspond to the eyelid being fully open. The eyelid being open by more than the open-eyelid threshold may correspond to the eyelid being at least partly open. The eyelid being closed by more than the closed-eyelid threshold may correspond to the eyelid being fully closed. The eyelid being closed by more than the closed-eyelid threshold may correspond to the eyelid being at least partly closed. The open-eyelid threshold may be the same as the closed-eyelid threshold. The open-eyelid threshold may be different from the closed-eyelid threshold.

The processor may be operable to cause the content-processing operation to change from being in one of the enabled state and the disabled state to being in the other of the enabled state and the disabled state by issuing a content-processing operation state change request.

The processor may be configured to determine, in response to a trigger, whether the content-processing operation has changed from being in the one of the enabled state and the disabled state to being in the other of the enabled state and the disabled state following the issuing of the content-processing operation state change request.

The trigger may be expiry of a predetermined time period.

The processor may be configured to issue a cancellation request to request cancellation of the content-processing operation state change request in response to the processor determining that the eyelid of the user of the device is currently in a state associated with the one of the enabled state and the disabled state and determining that the content-processing operation has not changed from being in the one of the enabled state and the disabled state to being in the other of the enabled state and the disabled state following the issuing of the content-processing operation state change request.

The content-processing component may comprise a graphics processing unit, a video processing unit and/or a display processing unit.

The sensor may comprise an infrared sensor. The infrared sensor may comprise a light-emitting diode arranged to emit infrared and a detector arranged to detect infrared reflected from the eyelid. The sensor may comprise a visible light sensor.

The data output by the sensor may be indicative of a current state of the eyelid. The data output by the sensor may be indicative of a change of state of the eyelid.

The processor may be configured to cause the content-processing operation to be in the disabled state in response to detecting that the user is not using the device.

The device may be or may be comprised in a headset. The headset may be a VR headset. The content-processing operation may be arranged to process VR content.

Various measures (for example devices, methods, computer programs and processors) are provided in which a processor is useable in a device. The processor is configured to cause a content-processing operation performable by a content-processing component of the device to be enabled when eyelid activity data output by a sensor of the device indicates that an eyelid of a user of the device is fully open and to be disabled when the eyelid activity data indicates that the eyelid is fully closed.

Various measures (for example devices, methods, computer programs and processors) are provided in which a processor is useable in a device. The processor is configured to cause a content-processing operation performable by a content-processing component of the device to change content-processing operation state dependent on eyelid activity data output by a sensor of the device.

Various measures (for example devices, methods, computer programs and processors) are provided in which a processor is useable in a device. The processor is configured to cause a content-processing operation performable by a content-processing component of the device to be disabled when eyelid activity data output by a sensor of the device indicates that a user of the device is not looking at a display screen associated with the device.

Various measures (for example devices, methods, computer programs and processors) are provided in which a device comprises a processor configured to process eyelid activity data output by an infrared sensor and to control a content-processing operation performable by a content-processing component based on the eyelid activity data output by the infrared sensor.

Various measures (for example devices, methods, computer programs and processors) are provided in which a headset comprises a processor configured to process eyelid activity data output by an infrared sensor of the headset and to control an operation performable by the headset based on the eyelid activity data output by the infrared sensor. The operation may be a content-processing operation performable by a content-processing component comprised in the headset. Alternatively, the operation may be another type of operation that does not relate to content-processing by a content-processing component. For example, the processor may be able to cause the headset to power up and/or down some or all components that are not content-processing components based on such eyelid activity data. For example, the processor may be able to cause the headset itself to power down in response to the eyelid activity data indicating that the user has fallen asleep.

The above embodiments are to be understood as illustrative examples of the disclosure. Further embodiments of the disclosure are envisaged.

Examples have been described above in which the device is a headset, such as a VR headset. However, the device may be another type of device. Examples of other types of device include, but are not limited to, laptop computing devices, tablet computing devices, smartphones, display screens, and smart televisions (TVs). In particular, although examples have been described in which the device is in close proximity to the user, the device may be located at a greater distance from the user. For example, in the case of a smart TV, the user may be seated several metres from the smart TV.

Examples have been described above in which the content processed by the content-processing component is VR content. However, the content-processing component may process other types of content. Examples of other types of content include, but are not limited to, Augmented Reality (AR) content, video content and image content.

Examples have been described above in which the content-processing operation is disabled when the eyelid of the user is closed by more than the closed-eyelid threshold, as a result of the user blinking. However, the content-processing operation may be disabled when the eyelid of the user is closed by more than the closed-eyelid threshold for another reason. An example of another reason is the user having closed their eyelid for a duration longer than a blink, for example if they have fallen asleep. As such, the content-processing operation may be disabled to save power when the user falls asleep and therefore is not consuming visual content processed by the device.

Examples have been described above in which the sensor comprises an IR sensor and/or a visible light sensor. However, the sensor may comprise another type of sensor. An example of another type of sensor is a microwave sensor. Various factors may be considered and/or traded off and/or optimised in selecting a sensor type. Examples of such factors include, but are not limited to, cost, accuracy, complexity, weight, power consumption requirements and operating range.

Examples have been described above in which the content-processing operation state is dependent on a state of an eyelid of the user of the device. In some examples, the state of the content-processing operation may be dependent on the state of both eyelids of the user. For example, the content-processing operation may only be disabled when both eyelids of the user are closed by more than the closed-eyelid threshold. In some examples, the content-processing operation may however be disabled when at least one eyelid of the user is closed by more than the closed-eyelid threshold, for example where the content-processing operation may be disabled in respect of one eye of the user and enabled in respect of the other eye of the user. Further, in some examples, the device may be a monocular HMD that comprises a single display screen for a single eye of the user. In such examples, the other eye of the user is not provided with a display screen. As such, the content-processing operation state may be dependent on a state of the eyelid of the user of the device which is associated with the single display screen of the monocular HMD.

Examples have been described above in which the processor causes the content-processing operation to be in an enabled state in response to the processing of the data output by the sensor indicating that the eyelid is open by more than an open-eyelid threshold and to be in a disabled state in response to the processing of the data output by the sensor indicating that the eyelid is closed by more than a closed-eyelid threshold. More generally, however, the processor may cause the content-processing operation to be in a first content-processing operation state in response to the processing of the data output by the sensor indicating that the eyelid is in a first state and to be in a second content-processing operation state in response to the processing of the data output by the sensor indicating that the eyelid is in a second state. For example, the first content-processing operation state may correspond to relatively high-quality processing of content and the second content-processing operation state may correspond to relatively low-quality processing of content, where the relatively low-quality processing of content involves use of less power than the relatively high-quality processing of content.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the disclosure.

What is claimed is:

1. A device comprising:
   a content-processing component operable to perform a content-processing operation;
   a sensor operable to output data indicative of activity of an eyelid of a user of the device; and
   a processor configured to:
      process the data output by the sensor;
      cause the content-processing operation to be in an enabled state in response to the processing of the data output by the sensor indicating that the eyelid is open by more than an open-eyelid threshold; and
      cause the content-processing operation to be in a disabled state in response to the processing of the data output by the sensor indicating that the eyelid is closed by more than a closed-eyelid threshold,
      wherein the processor is operable to cause the content-processing operation to change from being in one of the enabled state and the disabled state to being in the other of the enabled state and the disabled state by issuing a content-processing operation state change request, and
      wherein the processor is configured to determine, in response to a trigger, whether the content-processing operation has changed from being in the one of the enabled state and the disabled state to being in the other of the enabled state and the disabled state following the issuing of the content-processing operation state change request.

2. A device according to claim 1, wherein the eyelid being open by more than the open-eyelid threshold corresponds to the eyelid being fully open.

3. A device according to claim 1, wherein the eyelid being open by more than the open-eyelid threshold corresponds to the eyelid being at least partly open.

4. A device according to claim 1, wherein the eyelid being closed by more than the closed-eyelid threshold corresponds to the eyelid being fully closed.

5. A device according to claim 1, wherein the eyelid being closed by more than the closed-eyelid threshold corresponds to the eyelid being at least partly closed.

6. A device according to claim 1, wherein the open-eyelid threshold is the same as the closed-eyelid threshold.

7. A device according to claim 1, wherein the open-eyelid threshold is different from the closed-eyelid threshold.

8. A device according to claim 1, wherein the processor is configured to issue a cancellation request to request cancellation of the content-processing operation state change request in response to the processor determining that the eyelid of the user of the device is currently in a state associated with the one of the enabled state and the disabled state and determining that the content-processing operation has not changed from being in the one of the enabled state and the disabled state to being in the other of the enabled state and the disabled state following the issuing of the content-processing operation state change request.

9. A device according to claim 1, wherein the trigger comprises expiry of a predetermined time period.

10. A device according to claim 1, wherein the content-processing component comprises a graphics processing unit, a video processing unit and/or a display processing unit.

11. A device according to claim 1, wherein the sensor comprises an infrared sensor, the infrared sensor comprising:
    a light-emitting diode arranged to emit infrared; and
    a detector arranged to detect infrared reflected from the eyelid.

12. A device according to claim 1, wherein the sensor comprises a visible light sensor.

13. A device according to claim 1, wherein the processor is configured to cause the content-processing operation to be in the disabled state in response to detecting that the user is not using the device.

14. A device according to claim 1, wherein the device comprises or is comprised in a headset.

15. A device according to claim 14, wherein the headset comprises a virtual reality, VR, headset.

16. A device according to claim 1, wherein the content-processing operation is arranged to process VR content.

17. A device comprising:
    a content-processing component operable to perform a content-processing operation;
    a sensor operable to output data indicative of activity of an eyelid of a user of the device; and
    a processor configured to:
       process the data output by the sensor;
       cause the content-processing operation to be in a first content-processing operation state in response to the processing of the data output by the sensor indicating that the eyelid is in a first state;
       cause the content-processing operation to be in a second content-processing operation state in response to the processing of the data output by the sensor indicating that the eyelid is in a second state;
       cause the content-processing operation to change from being in one of the enabled state and the disabled state to being in the other of the enabled state and the disabled state by issuing a content-processing operation state change request; and
       determine, in response to a trigger, whether the content-processing operation has changed from being in the one of the enabled state and the disabled state to being in the other of the enabled state and the disabled state following the issuing of the content-processing operation state change request.

18. A device according to claim 17, wherein the device comprises or is comprised in a headset, and the sensor comprises an infrared sensor.

* * * * *